United States Patent [19]

Green

[11] Patent Number: 4,750,537
[45] Date of Patent: Jun. 14, 1988

[54] UNIVERSAL GOLF WOOD FACING MACHINE AND METHOD

[76] Inventor: Herbert Green, 1214 N. 11th St., Reading, Pa. 19604

[21] Appl. No.: 931,425

[22] Filed: Nov. 14, 1986

[51] Int. Cl.$^4$ .............................................. B27B 1/00
[52] U.S. Cl. ...................... 144/363; 33/508; 83/411 R; 144/2 XA; 144/134 R; 269/60; 269/80; 269/249
[58] Field of Search ............... 144/2 XA, 2 R, 118, 144/134 R, 134 E, 137, 329, 363, 372; 83/411 R; 269/56, 60, 80, 249; 33/508

[56] References Cited

U.S. PATENT DOCUMENTS 2,767,749 10/1956 Brandon ........................ 144/134 R
3,908,722 9/1975 Jacobs ............................. 144/2 XA Primary Examiner—W. Donald Bray
Attorney, Agent, or Firm—Leonard M. Quittner

[57] ABSTRACT

A golf club wood head facing machine is disclosed which comprises a base with a planar top upon which is mounted a face cutting assembly with a movable motor driven cutter which can be pivoted simultaneously both horizontally and vertically to shape the head's face to give it a defined bulge and roll. In addition thereto there is mounted on the assembly a club head holding mechanism consisting of a downwardly directed clamp above a railbed having two parallel rails mounted thereon to permit the seating and clamping of the golf head to be faced. The holder provides loft, face angle, face progression and lie adjustment means, as well as feed means to urge the club face forward against the cutter. Provision is also made to raise or lower the holder so as to locate the club face against the cutter. A method for finishing club head faces is also disclosed which uses the apparatus of the invention and consists of the steps of clamping the golf wood head face to cutter, setting a defined lie on the railbed, clamping the wood to the holder, setting a defined loft by means of the loft setting assembly, setting a defined face angle by means of the face angle subassembly, setting a defined bulge radius; setting a defined roll radius, turning on the machine, adjusting the height of the center of the wood face with the cutter, urging the wood face against the cutter, and shaping the face horizontally and vertically simultaneously.

39 Claims, 6 Drawing Sheets

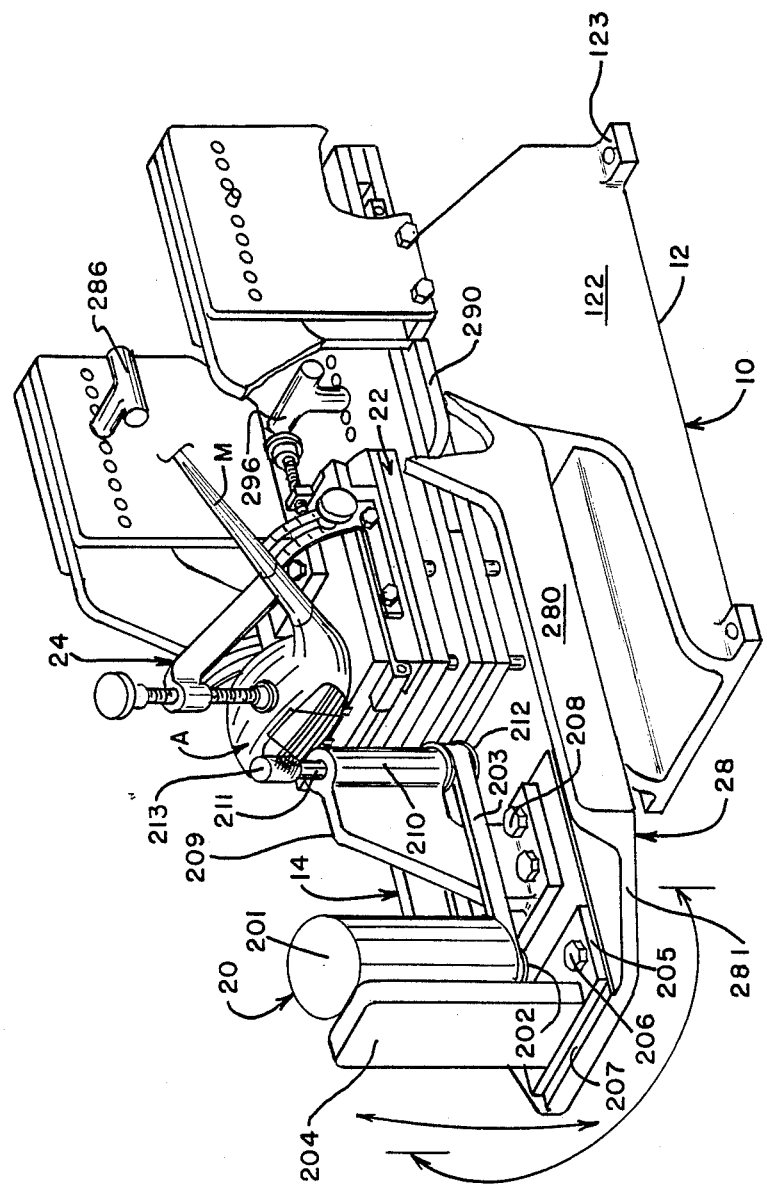

UNIVERSAL GOLF WOOD FACING MACHINE AND METHOD

CROSS-REFERENCES

There are no cross-references to nor are there any related applications.

FEDERALLY SPONSORED RIGHTS

The invention herein was made without any federal sponsorship or contribution.

BACKGROUND OF THE INVENTION

1. The Field of the Invention.

The field of the invention relates to an improved apparatus for finishing either in mass production or on a custom basis golf wood club head faces. In the golf club art, the term "wood" has come to encompass that class of clubs in which the driver is found, notwithstanding the fact that wood as a manufacturing material may no longer be used. In fact, the art includes heads made of other materials such as plastics, laminates involving wood, fiberglas or graphite composites and cast stainless steel or aluminum under the generic term of golf "wood." The present invention can be utilized to finish any head material. Except as read otherwise in context, the term "wood" as used throughout this application defines the class of club rather than the material.

2. Description of the Prior Art.

The prior art is summarized typically by U.S. Pat. Nos. 1,675,437 to Waldron, 4,245,391 and '392 to Hecker, 2,973,581 to Rhodehamel, 3,357,219 to Hunter, 3,439,429 to Sundstrom and 4,094,072 to Erb. Various devices are shown which only treat of adjusting lie and loft and calibrating them in golf clubs, whether woods or irons, by imparting a twist or bend to the shaft. '437 to Waldron is of interest but ignores, as does the rest of the art, the significance of the interaction of the six major factors in golf club head construction, repair or adjustment: loft, lie, face angle, face progression, bulge (curvature of face horizontally) and roll (curvature of face vertically) and that to do so can never produce a satisfactory club, whether newly made or adjusted. '437 appears to teach a device which will apply or correct loft and apply some bulge to a golf wood but one may infer that the art as of 1927 neither understood the importance of the variable nature of bulge and roll as factors nor the relationships among all the factors.

It is nevertheless true that automatic wood golf head turning machines which roughly shape laminated or solid head blocks are well-known. However, face finishing remains, essentially a manual art.

The present invention permits disposition of all six factors in golf wood construction and their interrelationship all at once and represents a revolutionary advance in the art.

The art as practiced is generally set forth in a certain text book, Maltby; Golf Club Design, Fitting, Alteration and Repair (1974; Newark, Ohio, Faultless Sports Div.) An abstract of pp. 137 through 161 is submitted herewith as an appendix on the assumption that the text because of its apparent limited distribution may not be part of the archives of the Office. It is requested that the appendix be filed with the application. Further, the appendix is submitted as a reference but no claim is made by your applicant as to any right to copy the materials therein contained other than for the purpose of this submission.

The terminology as used and defined in the text is adopted here as acceptable in the art and followed as closely as possible for the purposes of this application.

The six factors in wood head design and production interact with each other and present problems of many kinds to practitioners of the golf wood facing art because no ready means has been available to treat all of them simultaneously. The factors are defined in detail below as necessary for understanding. (Club head weight and shaft flexibility not being pertinent to this application are not considered hereunder).

The artisan frequently finds that changing one factor can inadvertently cause changes in another and that simultaneous coordination of all factors can be difficult to achieve. Until now, golf wood face production, repair, or alteration has been a highly skilled manual and judgmental art, requiring special gauges, jigs, templates and limited purpose fixtures as well as especially designed finishing equipment useful to the artisan. None of these combines the flexible and novel features of the present invention which solves all at one time in cooperation with each other and interactively the six major factors enumerated above with great accuracy with a low level of manual skill required by the user who can accomplish face changes without error or ruining his work.

A right or left handed club can be accommodated by the present invention and it will be obvious to one skilled in the art that the actual operation of wood face finishing can be automated by means well-known in the machinery arts.

SUMMARY OF THE INVENTION

The invention described herein is summarized as a boot shaped base with a planar top upon which is mounted a facing assembly with pivoting, adjusting and cutting means for accurately and automatically shaping a golf wood face in 3 dimensions simultaneously. The assembly includes a variable speed, motor driven shaping cutter subassembly which will produce any required bluge or roll and at the same time produce or correct for any defined lie, loft, face angle or reduced face progression, by means of a feedable holder mechanism which holds the golf head (and club shaft) in a defined attitude, face to cutter, during operation so that the face may be shaped continuously by a cutter mounted on a pivotable assembly which moves the cutter against the face simultaneously horizontally and verticallly.

An object of the invention is to provide a simple method and apparatus by which a golf wood club regardless of its head material construction can be automatically finished or altered to provide any defined roll, bulge, face angle, lie, loft and reduced head progression, and to provide a method and device by which a golf wood can be customized in its face to correct for the idiosyncratic golf swing of an individual golfer thereby enabling such a person to hit a golf ball in a desired directions, as for example by eliminating through club face shaping a tendency to hook or slice.

A further object of the invention is to provide to the golf wood repairer or constructor an automatic, machine operated means and method by which a golf wood face can be repaired, corrected or constructed so as to duplicate any desired roll, bulge, face angle, lie, loft and head progression or any combination of these factors as defined by any manufacturer, professional or player or to induce interactive corrections in the face to compensate for aberrations of swing or grip.

A further object of the invention is to enable a person of marginal manual skill to perform the work of a highly skilled golf wood maker or repairer with a minimum of training by use of the methods and devices of the invention.

Other objects, advantages and features of the present invention will be apparent to those skilled in the art from the following description taken in conjunction with the accompanying drawings.

DESCRIPTION OF DRAWINGS

The present invention may be better understood by reference to the drawings wherein thirteen (13) figures are shown on six (6) sheets. The numbers shown on the drawings for the various parts of the invention are consistent throughout so that a number indicating a part in one drawing will indicate the same part in another drawing.

FIG. 2 is a perspective view of the apparatus of the invention with certain cut-a-ways to enhance clarity.

DESCRIPTION OF THE PREFERRED EMBODIMENTS

The preferred embodiments are best described and understood by describing the various parts of the apparatus and its devices and their interrelationship and how the repairer or constructor, utilizing the apparatus of the present invention goes about making, altering or repairing a golf wood head (A), which has a face (B), a face insert (C), face grooves (D), a sweet spot (E), a crown (F), a heel (G), a toe (H), a sole (J), covered by a sole plate (K), a shank or hosel (L), all attached to a shaft (M), the wood having or requiring a defined angular lie (N), loft (P), face angle (Y), face progression (R), bulge (T) and roll (S).

Figure 5:
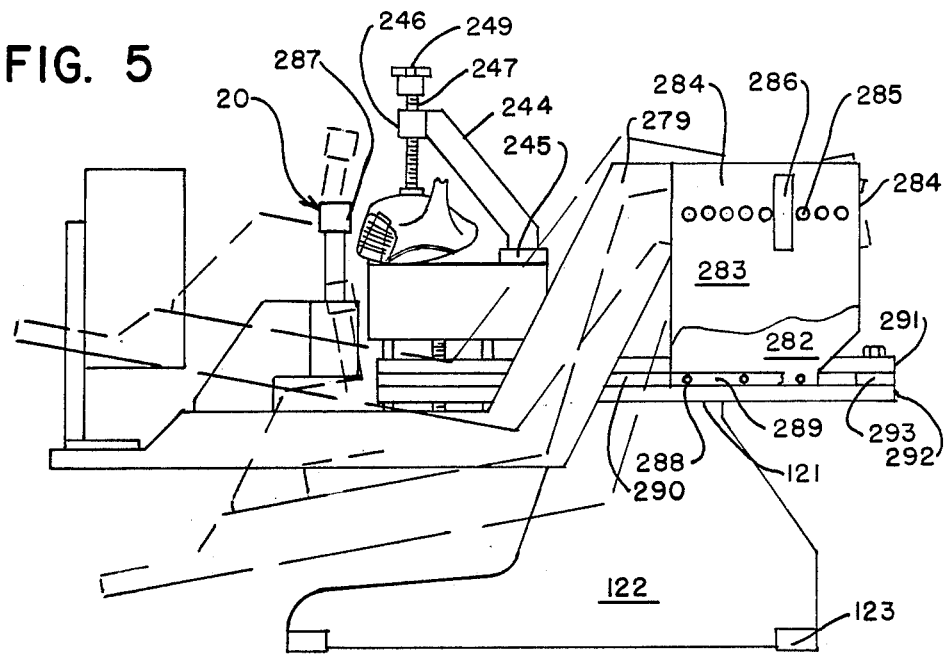
FIG. 5 shows the operation of roll shaping as a separate operation after desired loft, face angle and face progression have been defined.

The apparatus (10) comprises a base member (12) in the shape of a boot having a planar top (121) which is at a right angle with the boot sides (122) the boot being mounted by means of base mounting lugs (123) to a work surface (not shown) which may be a table or a pedestal. Affixed to the planar top and generally parallel thereto is a pivotable universal facing assembly (14) which is comprised of a variable speed, motor driven cutter sub-assembly (20) to shape the wood's face, a hand fed club head holder mechanism (22) for lie compensation, loft and face angle adjustment and reduction of face progression, a head clamp subassembly (24) to hold the head in a defined orientation, a holder height adjustment subassembly (26) to bring the face generally in plane with the cutter, and a compound shaper subassembly (28) with a roll shaper yoke (280) and a horizontally disposed bulge swivel plate (290) which permit together limited pivoting in both the horizontal and vertical planes simultaneously, see FIGS. 2, 5 and 6, to create a defined bulge and roll.

The variability of speed as mentioned above is useful with regard to the materials of the face being shaped. For example, using a speed of 1500 to 1800 surface feet per minute with a 50 grit emery drum sander proved adequate for wood or laminates thereof. Adjustment of speed downward for harder materials, such as graphite, was indicated as is the use of a fluted metal cutter in lieu of emeries of different grit sizes. With stainless steel materials, even slower speeds, finer hardened metal cutters and very light cuts are required as is the application of a coolant during facing.

I. The Cutter Subassembly (20)

The cutter subassembly (see FIG. 2) comprises a motor (201) mounted upright, shaft down (or alternatively up; not shown) with an exposed end (not shown) thereof having mounted thereon a first variable motor drive sheave (202) attached to a drive belt (203). The motor is rigidly affixed to a rectangular upright motor mount (204) which has at its extremity at a right angle thereto a motor mount base plate (205) bolted by motor base bolts (206) to a flat (207) milled in the forward portion (281) of the shaper yoke (280). Aft of the motor, bolted by tensioning bolts (208) through parallel tensioning slots (now shown) to hold the belt under tension and mounted at a right angle to the flat is an upright cutter stand (209) having a free end portion on which is formed a cutter journal box (210). The journal box holds encasingly a cutter shaft (211) whose longitudinal axis is perpendicular to the flat, the cutter shaft's inferior end having mounted thereto a second, variable sheave (212) responsive to the first sheave which is driven by the belt and whose superior end holds a drum shaped cutter (213) for shaping the club head as hereinafter described. The cutter subassembly, being an integral part of the roll shaper yolk, moves with it.

II. The club head holder mechanism (22)

The holder mechanism comprises a descending stack of cooperative, generally rectangular plate members (See FIGS. 3, 4, 7 and 8), the topmost of which is a railbed plate member (221) having disposed centrally beginning flush with the cutterside edge thereof on its upper face a pair of rails (222) parallel to each other a defined distance apart and of defined length for receiving the sole plate portion (K) of the head. The railbed is fitted at its cutterside end with a male loft hinge (223) bolted to its lower face. Fitted into the male loft hinge is a female loft hinge (223a) which is bolted to the upper face of a feed plate member (224) whereby the railbed plate can pivot upon the loft hinges by means of a through bolt (225) guidingly upward between a pair of arctuate guide limbs (226) bolted by means of limb bolts (227) to the outer sides of the feed plate, the arcs of the limbs curving cutterward. Each limb has cut therethrough an arctuate limb slot (228) which is of a radius concentric to the arc. Fitted in and passing through one of the limb slots is a loft locking, non-rotatable carriage bolt (229) which passes through the rail plate and the other limb slot, holding the rail plate slidingly and snugly to the limbs and lockingly when a knurled nut (229a) is tightened thereagainst to lock the railbed plate to the limbs at the loft angle (P) defined by loft degree graduations (230) inscribed on one of the limbs and defined by the angular displacement along a radius defined by the bolt holding the loft hinges as center and the limb slot as a circumference and measured by a fixed index mark scribed on the head of the non-rotatable loft locking bolt. As an alternative, the club number may be marked on the graduated limb, typically from 1 to 7, at appropriate defined degree points on the graduated scale, typically beginning at "1" for a driver or a number one wood. In this way, loft may be referred directly to the number of the club locked in the holder and adjusted fractionally upward relative to the club number.

The feed plate member has milled into its lower face a beveled channel (231) disposed centrally and longitudinally beginning at the cutterside end of the feed plate and extending through to its rearmost end. The channel is milled such that it snugly and slidingly fits over a raised bevel (232) formed on the upper surface of a rectangular feed guide member (233). The feed plate/-railbed combination and feed guid members are held together by means of a shoulder portion (234) of a shoulder bolt which slips through the feed plate and feed guide and which is through bolted to a face angle plate member (235) under the feed guide such that the railbed, feed plate and feed guide pivot together over the face angle plate which has graduations (236) marked thereon contiguous to an arctuate face angle slot (237) milled in the face angle plate's rearmost end and is calibrated from the through bolt as the center of a radius and the slot as a circumference for setting biasingly the face angle, left (238) or right (239) around a zero point (240) as indicated by an index (241; not visible) scribed centrally and vertically in the rear end of the feed guide plate. A knurled lock knob (242) attached to a face angle locking screw (242a) passes through the feed guide and locks it and the railbed, feed plate and guide appended thereto, to the face angle plate biasingly at a defined face angle as indicated by the markings. See FIG. 3. When set at zero (Yo) the outer sides of the rail bed, feed and guide and face angle plates are in alignment squarely with each other imparting a square face to the head. See FIG. 3.

The head clamp subassembly (see FIGS. 3 & 4) is bolted by means of clamp assembly bracket bolts (243) to the rear portion of the upper surface of the railbed plate. The head clamp subassembly consists of an upright-standing clamp bracket (244) having a bracket base (245) and an upper, threaded sleeve (246) overhanging the railbed and directed downward toward and over the rails such that the central longitudinal axis of the sleeve is at a right angle to the railbed. Threadingly installed in the sleeve is a clamping screw (247) whose upper end is fitted with a knurled tightening knob (248) and whose railside end has a shoe (249), typically of nylon, to clamp the golf head snugly to the railbed when installed. Bolted on the upper face of the feed plate's rear portion is the feed mechanism (25) consisting of a keeper block (250) which receives rotably a feed screw (251) which passes threadingly through a threaded feeder block (252) bolted to the upper surface of the feed guide such that when a feed knob (253) at the outer end of the feed screw is rotated the feed screw urges the railbed member with head clamp subassembly attached and feed plate member toward or away from the cutter while maintaining their loft orientation and face angle bias, if any, relative to the face angle plate.

Height adjustment (26) of the holder mechanism to bring the club face into alignment with the cutter's surface prior to operation is accomplished by means of a height adjustment screw (261) which slips rotably through upper (281) and lower (282) bulge swivel keeper plates and threadingly through a forward bulge plate spacer (262) located between the bulge plate keepers, said height adjustment screw turning freely in a recessed fixed washer (263) retained by a washer retaining plate (264) attached to the underface of the angle plate just aft of the shoulder bolt by retaining screws (265). As the height screw is turned by a height adjustment knob (266) at its free end, the holder assembly is raised or lowered in a plane parallel to the plane of the milled flat upon which the cutter subassembly rests, vertically on guide posts (267) disposed forward and aft of the height adjusting screw.

III. The compound shaper subassembly (28)

The compound shaper subassembly comprises, as viewed in the horizontal plane, (see FIG. 6), a "U" shaped shaper yoke (280) whose arm portions (279) are "Z" shaped as viewed in the vertical plane (see FIG. 5), the base of the "U" carrying the milled flat (207) and the cutter subassembly mounted thereon. The arms are disposed between inner (282) and outer (283) roll plates which have disposed horizontally and linearly therealong in their top portions (284) a multiplicity of holes (285) parallel to the top of each roll plate a defined distance apart, typically a half inch, or in lieu thereof an elongated slot of equivalent length from first hole to last hole through which are inserted and held counter-oppositely roll radius locator pivot pins (286) which define the center of the radius (Sr) of the roll, which typically is between 9 and 15 inches from either pin to the longitudinal center of the cutter's surface (287) as a circumference. The roll plates are bolted (288) together through (288) roll plate spacers (289) into the horizontal bulge swivel plate (290). The bulge swivel plate is fitted snugly and pivotably between the upper (291) and lower (292) bulge swivel keepers which are separated by a rear shaper spacer (293) the same thickness as the forward bulge plate spacer (262) and the bulge swivel plate such that the bulge plate is held snugly and pivotably between the bulge plate keepers. Disposed centrally, longitudinally and linearly rearward (294) on the upper bulge keeper and bored therethrough and through the bulge swivel plate and lower bulge keeper is a multiplicity of evenly spaced holes (295) a defined distance apart, typically a half inch, or in lieu thereof an elongated slot of equivalent length from first hole to last hole through which is inserted and held a bulge radius locator pin (296) which defines the center of the radius (Tr) of the bulge, which is typically between 9 and 15 inches from the bulge pin to the longitudinal center of the cutter's surface as a circumference.

IV. Compensating for improper lie.

Figure 1A:
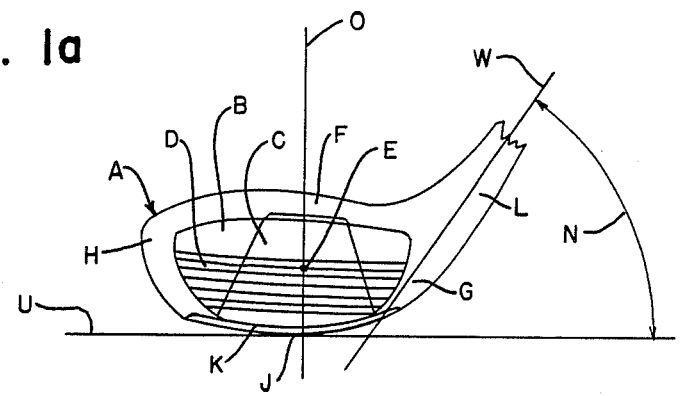
FIG. 1a is a front view of a golf wood club head, showing the face.

(See FIG. 1a) The lie of the wood is defined as an angle (N) formed by the intersection of a theoretical ground, or coincident sole, plane (U) which is tangent to the curve of the club sole (J) and perpendicular to a vertical line (O) through the center, or sweet spot (E), of the club face and the center line of the main longitudinal axis (W) of the hosel (L) and shaft (M). Player stance in addressing a golf ball is typically accommodated to the lie since the club is designed by the manufacturer to be gripped such that the sole plane coincides with and is parallel to the ground plane, i.e. the ground adjacent to the ball when the club is properly held. This angle, typically 55° in a driver and by one-half to one degree increments upward starting with a No. 2 wood, is a fixed function of club head manufacture and forms the referent from which at least roll, bulge, loft and face angle are determined. It occasionally occurs, the desires of teaching professionals notwithstanding, that certain players in addressing the ball cause the sole plane to become out of parallel with the ground plane thereby inducing an error in an otherwise correctly formed face and resultant continual bad shots. Factors such club length (not discussed) and physique of the player tend to cause the player to move back from the ball and to cause the sole plane to rotate in a heel-downward direction toward the player. (See FIG. 7). It is, therefore, desirable, in these cases, infrequent though they may be, that the lie angle, which is, in fact, a manufacturing constant, be compensated for in setting up the club head for refacing by revolving the perpendicular line (O) through the sweet spot and its defined sole tangent toward the heel as in FIG. 7 and refacing the club according to the new referent. Measurement with a weighted shaft protractor of a kind frequently found in "pro" or repair shops determines the correction, where the incurable lie defect can be measured in the field and may be duplicated on the protractor by setting the club head, sole down, on the rails (222) face squarely toward the motor and moving the shaft downward as in FIG. 7. If unconventional lie is not a problem, placing the sole on the rails such that the lie angle equals the manufacturer's lie specification is accomplished by setting the sole plate on the rails equidistantly, which should duplicate the manufactured angle. This can readily be verified with the protractor as hereinbefore described.

It is neither desirable to bend nor twist the shaft, as prompted by the prior art, to accomplish a lie angle change. Damage to the hosel may ensure and the result will leave the player's swing susceptible other and further faults. Experience has shown that refacing the club with lie compensation built-in as herein described accomplishes the desired correction without distorting the club.

Having established the referent lie, the head is clamped firmly to the rails (222) by the head clamp subassembly (24).

V. Setting or adjusting the loft.

Figure 1B:
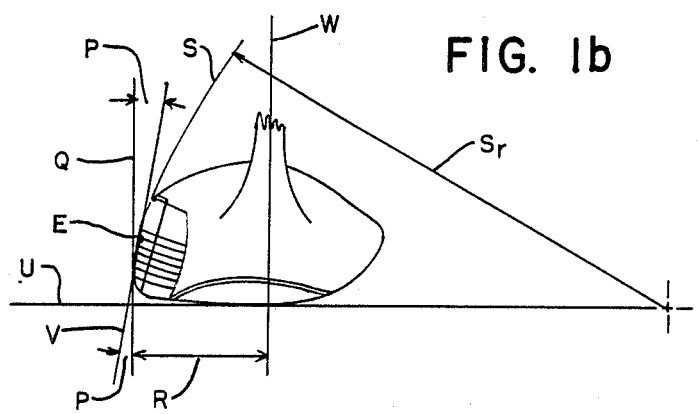
FIG. 1b is a side view of the head as viewed from the shank.

See FIG. 1b Loft (P) is the rake of the club face and is defined as the angle of the plane of the club face (V) through the sweet spot which intersects with a line (Q) on a plane parallel to the longitudinal center line of the shaft (W) and passing through the leading edge of the club face in line of flight. Dynamically, loft determines the angle of flight as the ball leaves the ground. It is well-known in the golfer's art that the greater the loft the higher a trajectory the ball will described in flight, decreasing the linear distance the shot will travel in so doing. Certain conditions of terrain and stance oftentimes make it difficult for a player to make a fairway wood shot; that is, without the benefit of a tee. This is also occasioned by a player's idiosyncratic swing with an otherwise satisfactory club which creates the illusion that the club does not have a sufficient loft. Merely selecting a wood as manufactured with a greater precalculated loft inevitably causes an undesirable sacrifice in distance. It has been found in the art that a small increase in defined loft angle in a wood used by a particular player can have a dramatic effect on his ability to make a fairway shot which achieves satisfactory distance.

Figure 8:
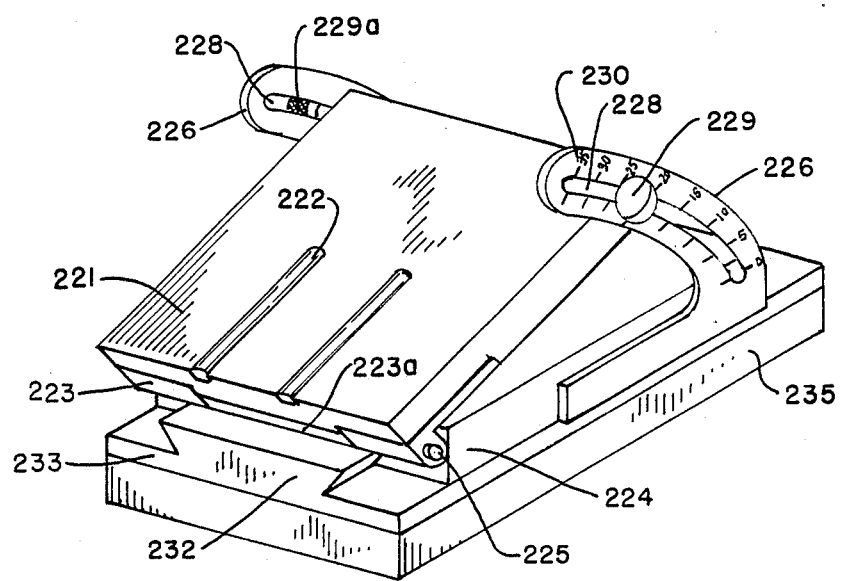

See FIG. 8. To set or adjust the loft according to the present invention, the loft locking screw (229) is loosened and the railbed (221) and club are pivoted upward until the defined amount of loft is found on the graduated limb (226) opposite the index and the loft locking screw is tightened snugly by the knob (229a).

VI. Setting or adjusting the face angle

Figure 1C:
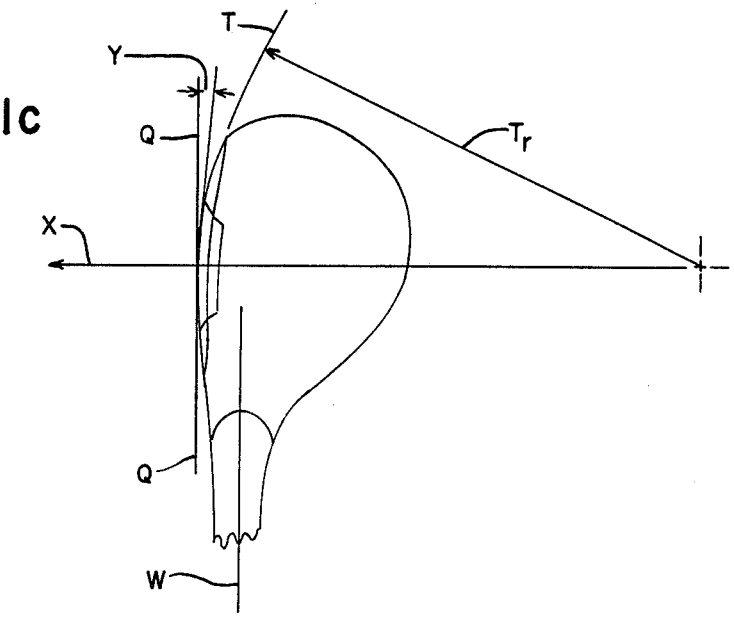
FIG. 1c is a plan view of the head.
Figure 1D:
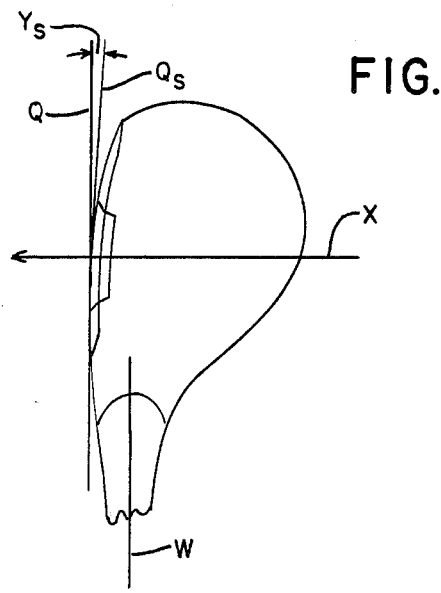
FIG. 1d is a plan view of the head showing an open face angle.
Figure 1E:
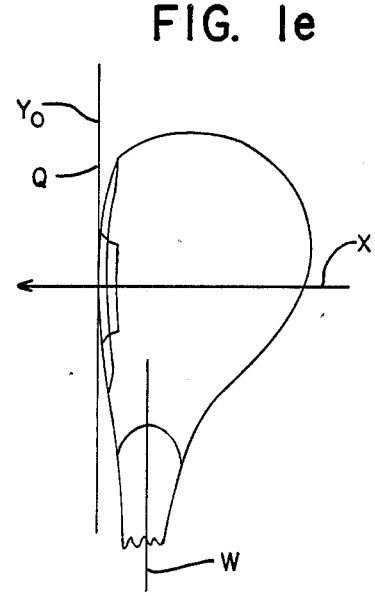
FIG. 1e is a plan view showing a zero, or square, face angle.
Figure 1F:
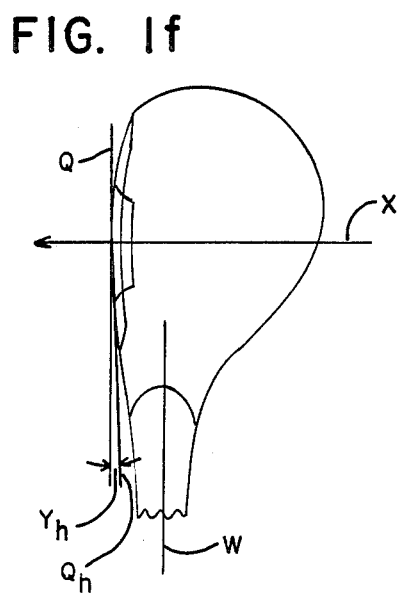
FIG. 1f shows a plan view with a closed face angle.
Figure 3:
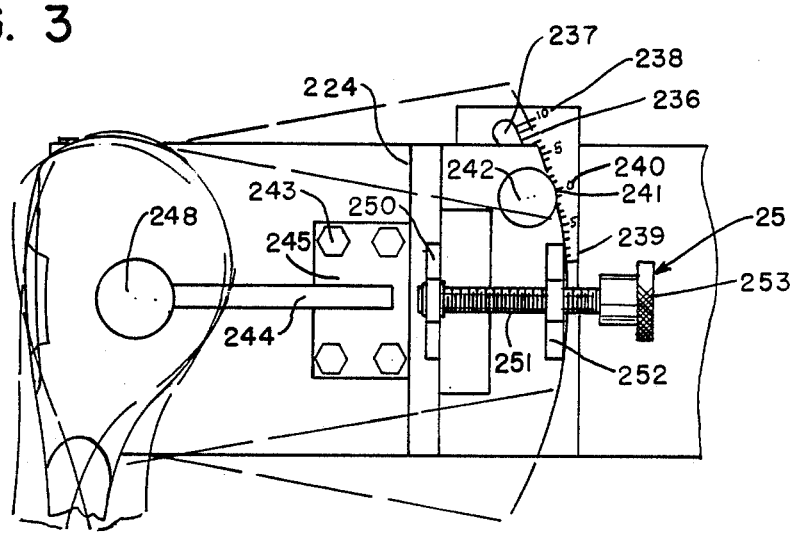
FIG. 3 shows the face angle adjustment mechanism prior to shaping.
Figure 4:
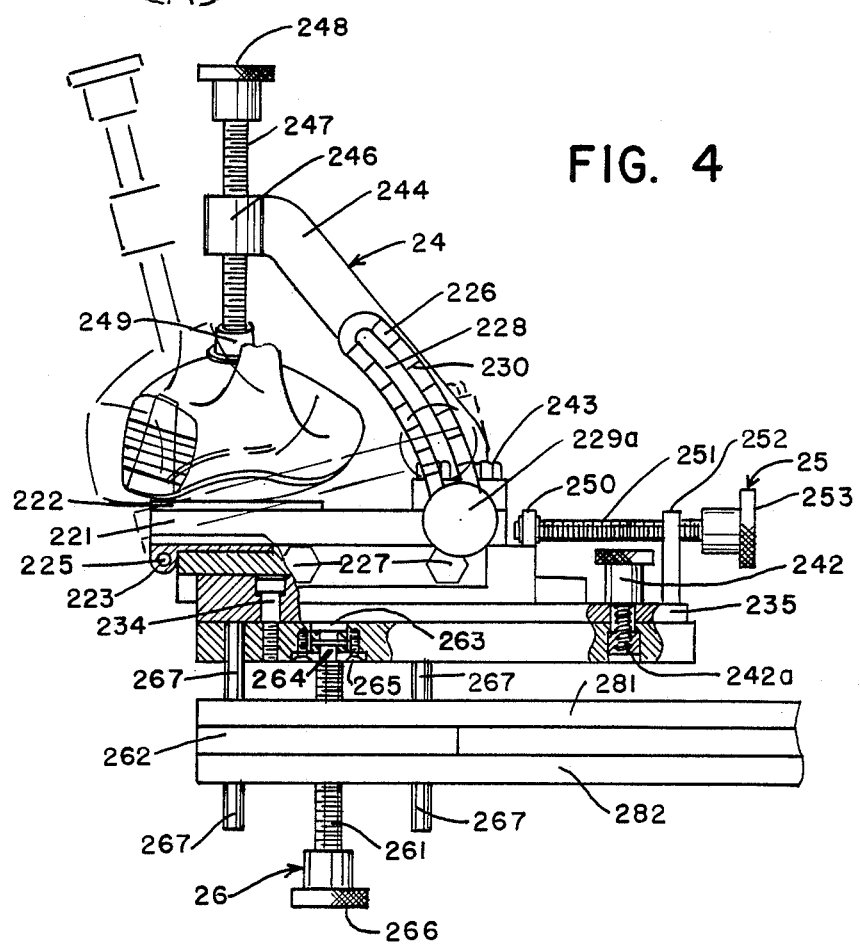
FIG. 4 shows how loft is induced.

See FIGS. 1d-f. Face angle (Y) is defined by the intersection of the leading edge plane (Q) and a line passing through the sweet spot horizontally (e.g. Qs). Typically the face is manufactured with a defined 2° open face angle (Ys); that is, the sweet spot horizontal line (Qs) is rotated away from the line of flight to provide a deliberate but small slice. Slice occurs as the ball fades away from the player at the end of the ball's trajectory relative to the theoretical line of flight (X). An intractable tendency to slice may be compensated for by teaching a player through hand grip adjustment to reduce the face angle (Yo) to zero where the horizontal (Qs) and the edge plane are parallel or beyond. The technique is called "closing the face". Oppositely, a tendency to hook or pull the ball toward the player at the end of its trajectory relative to the theoretical line of flight, i.e. with the face closed (Qh), may be corrected for by opening the face and changing the face angle oppositely (Yh).

As is frequently desirable, any face angle can be built into the clubhead to make the compensation for hook or slice a club function independent of grip. This is particularly useful where the player's grip has developed a set which can not be overcome by teaching. The face angle set screw (242) is loosened and the railbed, feed guide combination is rotated according to the graduations (236) on the angle plate from zero (Yo) in either direction to the desired number of degrees open (Ys) or closed (Yh) and locked. The determination of face angle is empirical and calculated from information supplied by and observation of the player shooting.

VII. Setting or adjusting roll (vertical face curvature)

See FIG. 1b. Roll (S) is the vertical face curvature from sole to crown and is truly circular. Radii (Sr) of 9 to 15 inches are typical. A main function of roll is to affect the quality of loft and attendant distance of the shot.

After the lie adjustment, face angle and loft are set in the holder mechanism as heretofore described, the defined roll radius (Sr) is selected by insertion of the first roll pivot pin (286) through the defined radius roll passageway (285), or a defined distance along the slot, from one of the inside roll plates (282) outward (283). The second roll pivot pin is then set in the matching locator passageway, or position in the slot in the other roll plates from the inside out such that the yoke pivots freely vertically. (See FIG. 2) The defined roll is ready for shaping as hereinafter described.

VI. Setting or adjusting bulge (horizontal face curvature)

Bulge is the horizontal face curvature from toe to heel and is also truly circular. See FIG. 1c. Radii (Tr) of 9 to 15 inches are typical. A main function of bugle is to compensate for a swing which marginally fails to bring the sweet spot into contact with the ball, inherently a difficult maneuver, thereby eliminating a minor tendency to slice or hook and to increase, in combination with roll, the transfer of maximum power from face to ball. The defined bulge radius (Tr) is selected by insertion of the bulge pivot pin (296) in the defined radius passage (295) or a defined distance along the bulge radius slot disposed on the upper bulge swivel keeper (291), through its matching passageway in the swivel plate (290) and through a similar passageway in the lower bulge swivel keeper (292) to establish the bulge radius (297). The face is then shaped as hereinafter described.

IX. Reducing the face progression

See FIG. 1b. Face progresssion (R) is the horizontal distance between vertical plane (Q) which passes through the leading edge of the club face, and is parallel to the plane through the central axis of the shaft (W) also perpendicular to the ground plane and bisecting the shaft from hosel toward the toe. Dynamically, face progression is significant at the instant the club face impacts with the ball. This occurs by design in advance of the pendular golf swing reaching its bottom. Idiosyncratically, a large face progression may decrease the player's control of a wood shot by magnifying the hook or slice.

Since face progression reduction is best accomplished during operation of the apparatus a description of its method of change is set forth therewith below.

X. Operation of the universal facing machine; face progression reduction

After a defined lie is set, the club head is firmly clamped to the rails on the railbed. A defined loft and face angle are then set as indicated by each graduated scale appropriate thereto and the holder plate members are locked into position as heretofore described. Roll radius and bulge radius are then selected by the defined location of the pivot pins. By means of the height adjustment subassembly the sweet spot is brought generally into alignment with the center of the cutter and the club head is urged toward the cutter by the feed screw subassembly (25) until cutter and clubhead are almost in contact.

Figure 6:
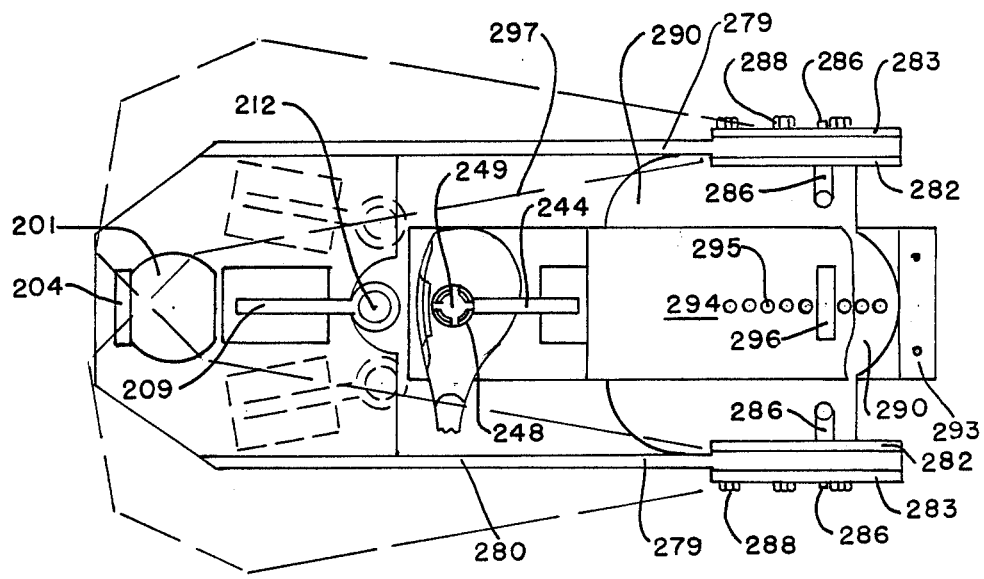
FIG. 6 shows the operation of bulge shaping which can be accomplished in conjunction with roll shaping or separately.
Figure 7:
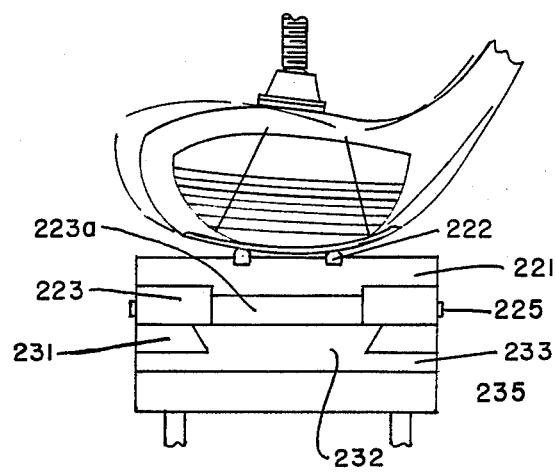
FIG. 7 shows how lie is adjusted and provides an end view of the head holder mechanism and FIG. 8 shows a perspective view of certain interactive holder mechanism members as they pertain to loft adjustment. It is to be noted in FIG. 8 that the loft locking knob and loft index (both hereinafter described) are reversed in position from how they would appear on an actual holder for the purposes of clarity.

The motor is started and the shaping process is begun by the artisan urging the face against the cutter and moving the yoke radially and vertically upward or downward (See FIG. 5) and horizontally in passes across the face while simultaneously swiveling the yoke radially on the bulge plate from side to side (FIG. 6). If a new face insert has been installed and, being somewhat oversize, protrudes outward of the face, the feed screw must be urged forward in successive steps until the insert is shaped flush with the face. Thereafter the balance of the shaping on the club face itself may proceed as herein described.

The side to side and up and down passes create the defined lie, loft, and face angle in combination with the defined roll and bulge simultaneously. The operation is complete when the artisan determines that no more cutting is taking plate in any direction. By urging the feed screw toward the cutter, as an additional step, all components will be preserved relative to each other and face progression may be reduced by continuous cutting to a defined distance until cutting is complete. The face is then grooved with a saw or similar cutting device. Varnishing the club head and applying whipping over the junction between hosel and shaft complete the process.

Since many modifications, variations and changes in detail may be made to the presently described embodiments, it is intended that all matter in the foregoing description and accompanying drawings be interpreted as illustrative and not by way of limitation.

What is claimed is:

1. A universal golf wood facing machine comprising:
   a. a base with a planar top upon which pivots horizontally and radially with a variable radius
   b. a facing assembly having a rectangular longitudinal plate member with a forward portion and a rear portion which is disposed pivotally horizontally and radially at its rear portion on the planar top, the forward portion having a milled flat on its upper surface upon which is installed
   c. a cutter subassembly having a motor driven variable speed, vertically disposed cutter which shapes a golf wood's face for bulge and roll when the yoke is pivoted simultaneously horizontally and vertically and the golf wood's face is urged against the cutter by means of a
   d. horizontally movable holder mechanism to clamp the golf wood face to cutter thereon, the holder having vertically pivoting loft adjustment means, horizontal pivoting face angle biasing adjustment means and feed means to feed the club face against the cutter for cutting.

2. A univeral golf wood facing machine as in claim 1 in which the yoke, when viewed in its horizontal plane is "U" shaped with a base section and arms, the arms being "Z" shaped when the yoke is viewed in its vertical plane, the "Z's" lower limb containing the "U's" base section and the "Z's" upper limb being the "U's" arms which pivot vertically and radially with a variable radius; at their ends the base section having a milled flat on its upper surface upon which is installed the cutter assembly.

3. A universal golf wood facing machine as in claim 2 wherein the holder mechanism has a clamp to hold the golf wood; the holder mechanism comprising an upper railbed plate which has disposed along its cutterside edge hinge means mounted to a lower feed plate and feed guide such that the railbed may be pivoted upward along the hinge and locked by locking means at a defined angle to permit shaping the wood's face to a defined loft angle; and such that the railbed, feed plate and feed guide may be pivoted horizontally together to apply a bias to the club face relative to a theoretical line of flight; said holder mechanism means having disposed on its underside, height adjusting means to permit aligning of the wood face with the cutter.

4. A universal golf wood facing machine as in claim 3 wherein the cutter is chosen from a class consisting of a drum sander and a fluted drum mill of metal.

5. A univeral golf wood facing machine comprising:

a. a base in the shape of a boot with flat sides which are at right angles to a planar top surface, the sides having a multiplicity of mounting lugs disposed along the side bottoms, the planar top having pivotally attached thereto a universal facing assembly which consists in ascending order of a bulge plate subassembly consisting of a lower rectangular bulge keeper plate with an upper and a lower surface and a cutterside portion which is longer than its rear portion, the rear portion being mounted pivotally horizontally on the planar top and having disposed in the rear portion a rear spacer plate bolted thereto contiguous to the lower bulge keeper's rear edge and in the forward portion the lower bulge keeper contiguous with its cutterside edge is bolted a forward spacer plate on the top surface thereof which is covered by an upper bulge plate keeper which defines between the keepers a gap in which is inserted snugly and pivotingly a bulge pivot plate having a cutter side, a rear side and outer sides all of a thickness equal to that of the rear and forward spacers and bored through the upper bulge plate, the pivot plate and the lower bulge plate, a multiplicity of circular passageways centrally disposed longitudinally therealong a defined distance apart such that when a pin is inserted snugly in any passageway the bulge plate pivots horizontally around the pin and describes an arc whose radius center is the pin and whose circumference is defined by the forward edge of the bulge plate subassembly, the radius being made variable by the pin location in a defined passageway and;

b. disposed along each outer edge of the bulge pivot plate is a pair of roll plates having upper and lower portions and spaced apart a defined distance by a spacer block bolted at their lower portions to the bulge pivot plate's outer edge thereby creating a gap between each pair of roll plates into which are inserted encasingly end portions of arms of a yoke, the yoke in its horizontal plane being "U" shaped and having a milled flat at its base and arms extending therefrom and the yoke in its vertical plane being "Z" shaped to permit insertion into the roll plates' gap the end portions of the arms and when the arms are inserted and made coincidental with the upper portions of the roll plates a multiplicity of centrally disposed longitudinal circular passageways therealong a defined distance apart are bored through the outer roll plate, the arm and the inner roll plate such that pins inserted snugly in passageways counter-oppositely to each other cause the yoke to pivot vertically around the pins and describe an arc whose radius center is either pin and whose circumference is described by the base of the "U", the radius being made variable by the pins' location in matching defined passageways, and c. a holding mechanism consisting of a golf head clamp with a clamp screw at a right angle to an upper railbed plate member having longitudinally disposed on its upper surface a pair of rails parallel to each other a defined distance apart and running from the railbed's cutterside edge toward the railbed's rear edge a defined distance and bolted to its lower surface the railbed has along its cutterside edge hinge means which is also bolted to a feed plate member's upper surface which is situated under and flush with the railbed such that the railbed and clamp may pivot upward along the hinge between arctuate, slotted, graduated limbs a defined angle and locked thereat by locking means; the feed plate having milled in its inferior surface longitudinally a beveled channel which mates snugly and slidingly with a raised bevel formed on the upper surface of a guide plate member situated under the feed plate; the guide plate having at its rearmost edge a feed screw subassembly which feeds the railbed and feed plate hingeward; the feed guide member being bolted pivotingly by a through shoulder bolt to a face angle plate forming the bottom member of the holder mechanism such that the railbed and feed members may pivot right and left of a center mark scribed on the face angle plate a defined angle relative to the cutter, the face angle plate having disposed along its bottom a height adjustment screw to raise and lower the holder mechanism; and disposed on the milled flat is d. a cutter subassembly bolted thereto comprising an upright motor whose shaft is fitted with a variable diameter sheave and belt connected to a variable diameter cutter sheave disposed on the inferior end of a cutter shaft mounted uprightly in a cutter shaft holder and responsive to the motor sheave to vary the speed of a cutter installed on the superior end of the cutter shaft.

6. In a universal golf wood facing machine as in claim 5 wherein the multiplicity of circular passageways in the bulge plate are formed as an elongated slot defining the distance from the first passageway to the last passageway.

7. In a universal golf wood facing machine as in claim 5 wherein the multiplicity of circular passageways in the roll plates are formed as an elongated slot defining the distance from the first passageway to the last passageway.

8. In a universal golf wood facing machine as in claim 5 wherein the cutter is chosen from a class consisting of an upright drum sander and a fluted drum mill of metal.

9. A golf wood loft angle adjusting device comprising a base, a holder mechanism to hold the wood and a cutter means whose cutting center is in a horizontal plane through a sweet spot situated on the wood face's surface; the holder having an upper plate member hinged to a lower plate member such that the upper plate may be pivoted toward the cutter means to a defined loft angle between the upper and lower plates and locked by locking means attached to the upper plate; the holder having feed means attached to its side opposite the cutter means said feed means urging the wood face against the cutter which is attached to vertical pivot means to cut into said wood face the defined loft angle.

10. A golf wood loft angle adjusting device as in claim 9 wherein the cutter is chosen from a class consisting of an upright drum sander and a fluted drum mill of metal.

11. A golf wood face angle adjusting device comprising a base, a holder mechanism to hold the wood and a cutter means whose cutting center is in a horizontal plane through a sweet spot situated on the wood face's surface, the holding mechanism having an upper and lower plate members the upper plate pivoting lockingly and horizontally a defined face angle in degrees right or left of a zero point on a lower plate member and the holder having feed means attached to its side opposite the cutter means, said feed means urging the wood face against the cutter which is attached to horizontal pivot means to cut into said wood face the defined face angle.

12. A golf wood face angle adjusting device as in claim 11 wherein the cutter is chosen from a class consisting of an upright drum sander and a fluted drum mill of metal.

13. A golf wood roll adjusting device comprising a base, a holder mechanism to hold the wood and a cutter means whose cutting center is in a horizontal plane through a sweet spot situated on the wood face's surface, the holder having feed means attached to its side opposite the cutter means said feed means urging the wood face against the cutter which is attached to a pivoting yoke attached to the base such that the yoke and cutter define a radius whose center is situated on the base and whose circumference is described by the cutter which is moved radially and vertically to cut a defined roll in the wood face.

14. A golf wood roll adjusting device as in claim 13 wherein the cutter is chosen from a class consisting of an upright drum sander and a fluted drum mill of metal.

15. A golf wood roll adjusting device as in claim 13 wherein the radius is made variable.

16. A golf wood bulge adjusting device comprising a base, a holder mechansim to hold the wood and a cutter means whose cutting center is in a horizontal plane through a sweet spot situated on the wood face's surface, the holder having feed means attached to its side opposite the cutter means said feed means urging the wood face against the cutter which is attached to a horizontally pivoting plate attached to the base such that the plate and cutter define a radius whose center is situated on the pivot point and whose circumference is described by the cutter means which will move radially and horizontally to cut a defined bulge in the wood face.

17. A golf wood bulge adjusting device as in claim 16 wherein the cutter is chosen from a class consisting of an upright drum sander and a fluted drum mill of metal.

18. A golf wood bulge adjusting device as in claim 16 wherein the radius is made variable.

19. A method of facing a golf wood comprising the steps of
 a. clamping the wood in a holding mechanism in a universal facing machine comprising a base with a planar top upon which pivots horizontally and radially with a variable radius
  (i) a facing assembly having a rectangular longitudinal plate member with a forward portion and a rear portion which is disposed pivotally horizontally and radially at its rear portion on the planar top, the forward portion having a milled flat on its upper surface upon which is installed
  (ii) a cutter subassembly having a motor driven variable speed, vertically disposed cutter which shapes a golf wood's face for bulge and roll when the yoke is pivoted simultaneously horizontally and vertically and the golf wood's face is urged against the cutter by means of a
  (iii) horizontally movable holder mechanism to clamp the golf wood face to cutter thereon, the holder having vertically pivoting loft adjustment means, horizontal pivoting face angle biasing adjustment means and feed means to feed the club face against the cutter for cutting;
 b. setting a defined lie on the rail bed;
 c. clamping the wood to the vise;
 d. setting a defined loft by means of the loft setting subassembly;
 e. setting a defined face angle by means of the face angle subassembly;
 f. setting a defined bulge radius;
 g. setting a defined roll radius;
 h. turning on the machine;
 i. adjusting the height of the center of the wood face with the cutter;
 j. urging the wood face against the cutter;
 k. sweeping the yoke and cutter horizontally and vertically against the wood face whereby the face is shaped by the cutter.

20. A method of facing a golf wood as in claim 19 wherein the face assembly has a yoke which when viewed in its horizontal plane is "U" shaped with a base section and arms, the arms being "Z" shaped when the yoke is viewed in its vertical plane, the "Z's" lower limb containing the "U's" base section and the "Z's" upper limb being the "U's" arms which pivot vertically and radially with a variable radius; at their ends the base section having a milled flat on its upper surface upon which is installed.

21. A method of facing a golf wood as in claim 19 wherein the horizontal movable holder mechanism has a clamp to hold the golf wood thereon, face toward the cutter, and means attached thereto to feed the wood face forward against the cutter; the holder mechanism comprising an upper railbed plate which has disposed along its cutterside edge hinge means mounted to a lower feed plate and feed guide such that the railbed may be pivoted upward along the hinge and locked by locking means at a defined angle to permit shaping the wood's face to the defined angle; and such that the railbed, feed plate and feed guide may be pivoted horizontally together to apply a bias to the club face relative to a theoretical line off light; said holder mechanism means having disposed on its underside height adjusting means to permit aligning of the wood face with the cutter.

22. A method of facing a golf wood as in claim 19 wherein the cutter is chosen from a class consisting of an upright drum sander and a fluted drum mill of metal.

23. A method of universally facing a golf wood comprising the steps of
 a. clamping the wood in a holding mechanism in a universal facing machine comprising
  (i) a base in the shape of a boot with flat sides which are at right angles to a planar top surface, the sides having a multiplicity of mounting lugs disposed along the side bottoms, the planar top having pivotally attached thereto a universal facing assembly which consists in ascending order of a bulge plate subassembly consisting of a lower rectangular bulge keeper plate with an upper and a lower surface and a cutter side portion which is longer than its rear portion, the rear portion being mounted pivotally horizontally on the planar top and having disposed in the rear portion a rear spacer plate bolted thereto contiguous to the lower bulge keeper's rear edge and in the forward portion the lower bulge keeper contiguous with its cutterside edge is bolted a forward spacer plate on the top surface thereof which is covered by an upper bulge plate keeper which defines between the keepers a gap in which is inserted snugly and pivotingly a bulge pivot plate having a cutter side, a rear side and outer sides all of a thickness equal to that of the rear and forward spacers and bored through the upper bulge plate, the pivot plate and the lower bulge plate, a multiplicity of circular passageways centrally disposed longitudinally therealong a defined distance apart such that when a pin is inserted snugly in any passageway the bulge plate pivots horizontally around the pin and describes an arc whose radius center is the pin and whose circumference is defined by the forward edge of the bulge plate subassembly, the radius being made variable by the pin location in a defined passageway and;

(ii) disposed along each outer edge of the bulge pivot plate is a pair of roll plates having upper and lower portions and spaced apart a defined distance by a spacer block bolted at their lower portions to the bulge pivot plate's outer edge thereby creating a gap between each pair of roll plates into which are inserted encasingly end portions of arms of a yoke, the yoke in its horizontal plane being "U" shaped and having a milled flat at its base and arms extending therefrom and the yoke in its vertical plane being "Z" shaped to permit insertion into the roll plates' gap the end portions of the arms and when the arms are inserted and made coincidental with the upper portions of the roll plates a multiplicity of centrally disposed longitudinal circular passageways therealong a defined distance apart are bored through the outer roll plate, the arm and the inner roll plate such that pins inserted snugly counter-oppositely to each other in passageways cause the yoke to pivot vertically around the pins and describe an arc whose radius center is either pin and whose circumference is described by the base of the "U", the radius being made variable by the pins' location in matching defined passageways, and (iii) a holding mechanism consisting of a golf head clamp with a clamp screw at a right angle to an upper railbed plate member having longitudinally disposed on its upper surface a pair of rails parallel to each other a defined distance apart and running from the railbed's cutterside edge toward the railbed's rear edge a defined distance and bolted to its lower surface the railbed has along its cutterside edge hinge means which is also bolted to a feed plate member's upper surface which is situated under and flush with the railbed such that the railbed and clamp may pivot upward along the hinge between arctuate, slotted, graduated limbs a defined angle and locked thereat by locking means; the feed plate having milled in its inferior surface longitudinally a beveled channel which mates snugly and slidingly with a raised bevel formed on the upper surface of a guide plate member situated under the feed plate; the guide plate having at its rearmost edge a feed screw subassembly which feeds the railbed and feed plate hingeward; the feed guide member being bolted pivotingly by a through shoulder bolt to a face angle plate forming the bottom member of the holder mechanism such that the railbed and feed members may pivot right and left of a center mark scribed on the face angle plate a defined angle relative to the cutter, the face angle plate having disposed along its bottom a height adjustment screw to raise and lower the holder mechanism; and disposed on the milled flat is (iv) a cutter subassembly bolted thereto comprising an upright motor whose shaft is fitted with a variable diameter sheave and belt connected to a variable diameter cutter sheave disposed on the inferior end of a cutter shaft mounted upright in a cutter shaft holder and responsive to the motor sheave to vary the speed of a cutter installed on the superior end of the cutter shaft;

b. setting a defined lie on the railbed;
c. clamping the wood to the vise;
d. setting a defined loft by means of the loft setting subassembly;
e. setting a defined face angle by means of the face angle subassembly;
f. setting a defined bulge radius;
g. setting a defined roll radius;
h. turning on the machine;
i. adjusting the height of the center of the wood face with the cutter;
j. urging the wood face against the cutter;
k. sweeping the yoke and cutter horizontally and vertically against the wood face whereby the face is shaped by the cutter.

24. A method of universally facing a golf wood as in claim 23 wherein the multiplicity of circular passageways in the bulge plate are formed as an elongated slot defining the distance from the first passageway to the last.

25. A method of universally facing a golf wood as in claim 23 wherein the multiplicity of circular passageways in the roll plates are formed as an elongated slot defining the distance from the first passageway to the last.

26. A method of universally facing a golf wood as in claim 23 wherein the cutter is chosen from a class consisting of an upright drum sander and a fluted drum mill of metal.

27. A method for adjusting a golf wood's loft comprising the steps of
a. clamping the wood face to cutter in a golf wood loft angle adjusting device comprising a base, a holder mechanism to hold the wood and a cutter means whose cutting center is in a horizontal plane through a sweet spot situated on the wood face's surface; the holder having an upper plate member hinged to a lower plate member such that the supper plate may be pivoted toward the cutter means to a defined loft angle between the upper and lower plates and locked by locking means attached to the upper plate; the holder having feed means attached to its side opposite the cutter means said feed means urging the wood face against the cutter which is attached to vertical pivot means to cut into said wood face the defined loft angle;
b. setting the loft by pivoting the upper plate member to a defined loft angle;
c. locking the plate member;
d. starting the motor;
e. urging the holder against the cutter;
f. cutting the loft angle into the club face by vertical movement of the cutter.

28. A method for adjusting a golf wood's loft as in claim 27 wherein the cutter is chosen from a class consisting of an upright drum sander and a fluted drum mill of metal.

29. A method for adjusting a golf wood's face angle comprising the steps of
   a. clamping the wood face to cutter in a golf wood face angle adjusting device comprising a base, a holder mechanism to hold the wood and a cutter means whose cutting center is in a horizontal plane through a sweet spot situated on the wood face's surface, the holding mechanism having an upper and lower plate members, the upper plate pivoting lockingly and horizontally a defined face angle in degrees right or left of a zero point on a lower plate member and the holder having feed means attached to its side opposite the cutter means, said feed means urging the wood face against the cutter which is attached to horizontal pivot means to cut into said wood face the defined face angle;
   b. setting the face angle;
   c. locking the face angle;
   d. starting the motor;
   e. urging the holder against the cutter;
   f. cutting the face angle into the club face by horizontal movement of the cutter.

30. A method for adjusting a golf wood's face angle as in claim 29 wherein the cutter is chosen from a class consisting of an upright drum sander and a fluted drum mill of metal.

31. A method for adjusting the golf wood's roll comprising the steps of
   a. clamping the wood face to cutter in a golf wood roll adjusting device comprising a base, a holder mechanism to hold the wood and a cutter means whose cutting center is in a horizontal plane through a sweet spot situated on the wood face's surface, the holder having feed means attached to its side opposite the cutter means said feed means urging the wood face against the cutter which is attached to a pivoting yoke attached to the base such that the yoke and cutter define a radius whose center is situated on the base and whose circumference is described by the cutter which is moved radially and vertically to cut a defined roll in the wood face;
   b. setting the roll radius;
   c. locking the roll radius;
   d. starting the motor;
   e. urging the holder toward the cutter so the sweet spot touches the cutter;
   f. pivoting the plate and cutter vertically radially;
   g. cutting the roll into the face by the horizontal and radial movement of the yoke.

32. A method for adjusting a golf wood's roll as in claim 31 wherein the cutter is chosen from a class consisting of an upright drum sander and a fluted drum mill of metal.

33. A method for adjusting a golf wood's bulge comprising the steps of:
   a. clamping the wood face to cutter in a golf wood bulge adjusting device comprising a base, a holder mechanism to hold the wood and a cutter means whose cutting center is in a horizontal plane through a sweet spot situated on the wood face's surface, the holder having feed means attached to its side opposite the cutter means said feed means urging the wood face against the cutter which is attached to a horizontally pivoting plate attached to the base such that the plate and cutter define a radius whose center is situated on the pivot point and whose circumference is described by the cutter means which will move radially and horizontally to cut a defined bulge in the wood face;
   b. setting the bulge radius;
   c. locking the bulge radius;
   d. starting the motor;
   e. urging the holder toward the cutter so the sweet spot touches the cutter;
   f. pivoting the plate radially horizontally;
   g. cutting the bulge into the face by the horizontal and radial movement of the bulge plate.

34. A method for adjusting a golf wood's bulge as in claim 33 wherein the cutter is chosen from a class consisting of an upright drum sander and a fluted drum mill of metal.

35. A universal golf wood head facing machine comprising:
   a. a base for supporting a cutter assembly which assembly is mounted for limited rotation about two perpendicular axes having independently variable radii;
      (i) the cutter assembly including a yoke member having a forward and a rear portion with the rear portion connected in apporting relationship to the base,
      (ii) a cutter subassembly mounted on the forward portion of the cutter assembly including a cutter adapted to mill the face of a golf head;
   b. a holder mechanism to clamp the golf head in a defined attitude with its face toward the cutter and having means to move the golf head into and out of contact with the cutter subassembly;
   whereby when the assembly is rotated about both of its axes while the cutter is in milling relationship to the cutter, the bulge and roll of the club are independently but simultaneously established.

36. A device for facing the head of a golf club wood comprising:
   a frame,
   a cutter assembly and a head clamping assembly mounted on the frame;
   the head clamping assembly including a base plate adapted to receive and support the sole of the head of a club and a clamping device to secure the head in a fixed position with the face of the head pointing toward the cutter assembly;
   the cutter assembly having means for mounting a rotary cutting tool which support means is mounted on radius arms for rotation about two axes which are perpendicular to each other, characterized in that the length radius arms of the support independently adjustable whereby bulge and the roll of the head can be simultaneously but independently determined.

37. Apparatus according to claim 36 wherein the head clamping assembly is mounted for rotation about a vertical axis.

38. An apparatus according to claim 36 wherein the head clamping assembly is mounted for rotation about a horizontal axis.

39. A universal golf wood facing machine comprising:
   (a) a base;
   (b) a facing assembly mounted on the base for rotation about horizontal and vertical axes;
   (c) a cutter subassembly adapted to machine the face of the golf wood supported by the facing assembly and radially spaced from the axes of rotation of the facing assembly;

(c) means for adjusting the cutter assembly to control the radial spacing of the cutter subassembly from the horizontal and vertical axes of rotation independent of each other; and (e) a holder to clamp the head of a golf wood in a defined attitude, with its face aligned toward the cutter and the holder having means to move the head into and out of engagement with the cutter subassembly.

* * * * *